(12) United States Patent
Kim et al.

(10) Patent No.: US 8,509,854 B2
(45) Date of Patent: Aug. 13, 2013

(54) MOBILE TERMINAL AND METHOD OF CONTROLLING OPERATION OF THE SAME

(75) Inventors: Min Joo Kim, Seoul (KR); Hang Jun Cho, Seoul (KR); Jeong Hyuk Yoon, Seoul (KR); Yun Hwan Kang, Seoul (KR); Sung Eun Bang, Seoul (KR); Sang Hyun Lee, Seoul (KR); Min Soo Park, Seoul (KR); Hyo Jin Suh, Seoul (KR); Hye Youn Cho, Seoul (KR); Hye Eun Shin, Seoul (KR); Se Il Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 742 days.

(21) Appl. No.: 12/212,891

(22) Filed: Sep. 18, 2008

(65) Prior Publication Data
US 2009/0075694 A1    Mar. 19, 2009

(30) Foreign Application Priority Data

Sep. 18, 2007 (KR) .................. 10-2007-0094836
Sep. 28, 2007 (KR) .................. 10-2007-0097896

(51) Int. Cl.
*H04B 1/38* (2006.01)
(52) U.S. Cl.
USPC ............. 455/566; 455/550.1; 455/556.1; 455/556.2; 455/557; 345/168; 345/169; 345/170; 345/171; 345/173; 715/784; 715/785; 715/786; 715/787; 715/810; 715/833
(58) Field of Classification Search
USPC ................. 455/412.2, 418, 550.1, 557, 564, 455/566, 567, 556.2, 556.1; 345/168–171, 345/173; 715/784–787, 810, 833
See application file for complete search history.

(56) References Cited

U.S. PATENT DOCUMENTS

| | | | | |
|---|---|---|---|---|
| 6,593,949 | B1 * | 7/2003 | Chew et al. ................... | 715/841 |
| 7,123,946 | B2 * | 10/2006 | Tsuchiyama ................. | 455/566 |
| 7,280,850 | B2 * | 10/2007 | Hama et al. ................... | 455/566 |
| 7,418,663 | B2 * | 8/2008 | Pettinati et al. ............... | 715/739 |
| 7,523,412 | B2 * | 4/2009 | Jones et al. ................... | 715/787 |
| 7,556,204 | B2 * | 7/2009 | Jacobsen .................. | 235/472.01 |

(Continued)

FOREIGN PATENT DOCUMENTS

| | | |
|---|---|---|
| CN | 1774020 | 5/2006 |
| CN | 1921667 | 2/2007 |
| EP | 1 310 860 A1 | 5/2003 |
| EP | 1 752 860 A1 | 2/2007 |

OTHER PUBLICATIONS

European Search Report dated Jan. 7, 2013 issued in Application No. 08 016452.

*Primary Examiner* — Olumide T Ajibade Akonai
(74) *Attorney, Agent, or Firm* — KED & Associates LLP

(57) ABSTRACT

This patent relates to a mobile terminal and a method of controlling an operation of the same. The method of controlling an operation of a mobile terminal includes displaying a file list and scroll arrows for scrolling the file list on a touch screen. When the scroll arrow is touched and entered, the file list is scrolled at a scroll speed previously set in response to a time when the scroll arrow is touched and entered. A vibration signal to identify at least one of a scroll speed and a current scrolling position of the file list is provided. Accordingly, when a file list is scrolled, a scroll speed or a current scrolling position can be easily identified by a tactile sense.

33 Claims, 17 Drawing Sheets

(56) References Cited

U.S. PATENT DOCUMENTS

| | | | |
|---|---|---|---|
| 7,761,806 B2 * | 7/2010 | Kim | 715/784 |
| 7,925,986 B2 * | 4/2011 | Aravamudan | 715/773 |
| 2002/0033795 A1 | 3/2002 | Shahoian et al. | 345/156 |
| 2003/0222536 A1 | 12/2003 | Morton et al. | 310/317 |
| 2003/0224830 A1 * | 12/2003 | Zhang et al. | 455/566 |
| 2004/0119732 A1 * | 6/2004 | Grossman et al. | 345/708 |
| 2004/0204129 A1 * | 10/2004 | Payne et al. | 455/566 |
| 2005/0091604 A1 * | 4/2005 | Davis | 715/772 |
| 2006/0049920 A1 | 3/2006 | Sadler et al. | 340/407.1 |
| 2006/0059436 A1 * | 3/2006 | Nurmi | 715/786 |
| 2006/0236264 A1 * | 10/2006 | Cain et al. | 715/788 |
| 2006/0271870 A1 * | 11/2006 | Anwar | 715/764 |
| 2007/0176742 A1 * | 8/2007 | Hofmann et al. | 340/7.6 |
| 2007/0211040 A1 * | 9/2007 | Wang et al. | 345/173 |
| 2008/0026736 A1 * | 1/2008 | Funabashi et al. | 455/415 |
| 2008/0146210 A1 * | 6/2008 | Somani et al. | 455/418 |
| 2008/0280600 A1 * | 11/2008 | Zhou | 455/415 |

* cited by examiner

MOBILE TERMINAL AND METHOD OF CONTROLLING OPERATION OF THE SAME

CROSS-REFERENCE TO RELATED APPLICATION

This application claims the priority benefit of Korean Patent Application No. 10-2007-0094836, filed on Sep. 18, 2007 and No. 10-2007-0097896, filed on Sep. 28, 2007 in the Korean Intellectual Property Office, the disclosure of which is incorporated herein by reference.

BACKGROUND

1. Field

The present invention relates to a portable device, and in more particular, a mobile terminal.

2. Background

A mobile terminal is a portable device equipped with one or more of functions for performing voice and video communications while being carried with, inputting and outputting information, storing data and so on. In line with the diversity of the functions, the mobile terminal has become equipped with complicated functions, such as capturing of photos or motion images, the play of music files or motion image files, gaming, reception of broadcasting, and wireless Internet, and therefore has been implemented in the form of a comprehensive multimedia player.

In order to implement the complicated functions, a variety of attempts have been made to mobile terminals, implemented in the multimedia player form, in terms of hardware or software. For example, one of the attempts can include a user interface environment in which a user can search or select functions easily and conveniently. Further, as the mobile terminal has been considered as one of personal belongings for expressing a user's personality, there is a need for a change in the designs of various forms.

SUMMARY OF THE EMBODIMENTS

An object is to solve problems of the related art.
Another object is to provide an improved new interface.
A further object is to provide improved feedback to a user during use of the mobile terminal.

BRIEF DESCRIPTION OF THE DRAWINGS

The embodiments will be described in detail with reference to the following drawings in which like reference numerals refer to like elements wherein.

DETAILED DESCRIPTION

It is to be understood that a mobile terminal described in this specification can include mobile phones, smart phones, notebook computers, terminals for digital broadcasting, personal digital assistants (PDAs), portable multimedia players (PMPs), navigation devices for GPS, etc.

Figure 1:
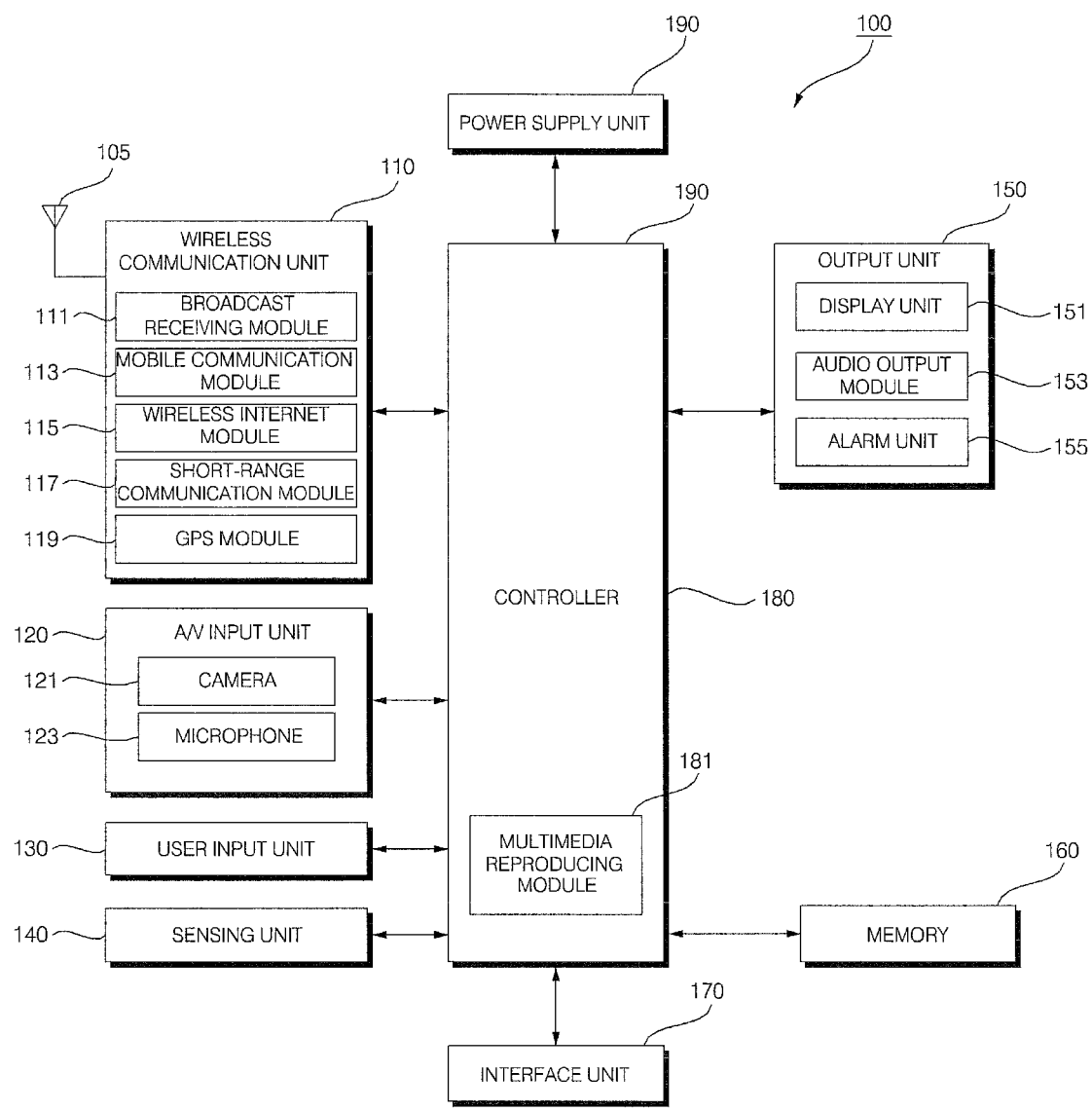
FIG. 1 is a block diagram of a mobile terminal in accordance with an embodiment.

FIG. 1 is a block diagram of a mobile terminal in accordance with an embodiment of the present invention. The mobile terminal in accordance with an embodiment of the present invention is described below with reference to FIG. 1 from a standpoint of constituent elements according to their functions. It is also to be noted that the suffix of constituent elements used in the following description, such as "module" and "unit", is simply assigned by considering the easiness of writing this specification, but is not specifically assigned by considering the importance and roles. Accordingly, the "module" and "unit" can be mixed in use. Further, module and unit can be either hardware/circuitry or firmware/software.

Referring to FIG. 1, a mobile terminal 100 can include a wireless communication unit 110, an audio/video (A/V) input unit 120, a user input unit 130, a sensing unit 140, an output unit 150, memory 160, an interface unit 170, a controller 180, and a power supply unit 190. When the constituent elements are implemented in actual applications, two or more of the constituent elements can be combined into one constituent element or one constituent element can be divided into two or more constituent elements, if appropriate.

The wireless communication unit 110 can include a broadcasting receiving module 111, a mobile communication module 113, a wireless Internet module 115, a short-range communication module 117, a global positioning system (GPS) module 119 and so on.

The broadcasting receiving module 111 receives at least one of broadcasting signals and broadcasting-related information from an external broadcasting management server through broadcasting channels. The broadcasting channels can include a satellite channel, a terrestrial wave channel and the like. The broadcasting management server can refer to a server for creating and transmitting at least one of broadcasting signals and broadcasting-related information or a sever for receiving at least one of previously generated broadcasting signals and previously generated broadcasting-related information and transmitting it to a terminal.

The broadcasting-related information can refer to information pertinent to a broadcasting channel, a broadcasting program and/or a broadcasting service provider. The broadcasting signal can include not only TV broadcasting signals, radio broadcasting signals, and data broadcasting signals, but also broadcasting signals in which TV broadcasting signals or radio broadcasting signals are combined with data broadcasting signals. The broadcasting-related information can be provided over a mobile communication network. In this case, the broadcasting-related information can be received by the mobile communication module 113. The broadcasting-related information can exist in various forms. For example, the broadcasting-related information can exist in the form of the electronic program guide (EPG) of the digital multimedia broadcasting (DMB), the electronic service guide (ESG) of the digital video broadcast-handheld (DVB-H) or the like.

The broadcasting receiving module 111 receives broadcasting signals using various broadcasting systems. In particular, the broadcasting receiving module 111 can receive broadcasting signals using a digital broadcasting system, such as the digital multimedia broadcasting-terrestrial (DMB-T), the digital multimedia broadcasting-satellite (DMB-S), the media forward link only (MediaFLO), the digital video broadcast-handheld (DVB-H), and the integrated services digital broadcast-terrestrial (ISDB-T. The broadcasting receiving module 111 can be constructed to be suitable for not only the digital broadcasting systems, but also all broadcasting systems providing broadcasting signals. At least one of broadcasting signals and/or broadcasting-related information, received through the broadcasting receiving module 111, can be stored in the memory 160.

The mobile communication module 113 transmits and receives radio signals to and from at least one of a base station, an external terminal, and a server over a mobile communication network. Here, the radio signals can include voice call signals, video call signals, or various forms of data according to transmission/reception of text/multimedia messages.

The wireless Internet module 115 refers to a module for wireless Internet access. The wireless Internet module 115 can be built in the mobile terminal 100 or external to the mobile terminal 100. The short-range communication module 117 refers to a module for local area communication. Local area communication technology can employ Bluetooth, radio frequency identification (RFID), infrared data association (IrDA), ultra wideband (UWB), ZigBee or the like. The GPS module 119 receives position information from a plurality of GPS satellites or based on movement determination (non-GPS system for location determination).

The A/V input unit 120 is adapted to input audio signals or video signals and can include a camera 121, a microphone 123, and so on. The camera 121 processes image frames, such as still images or motion images, which are captured by an image sensor in the video call mode or the capturing mode. The processed image frames can be displayed on a display unit 151.

The image frames processed by the camera 121 can be stored in the memory 160 or transmitted to the outside through the wireless communication unit 110. The camera 121 can be provided in plural numbers according to the configuration of a terminal.

The microphone 123 receives external sound signals in the call mode, the recording mode, the voice recognition mode, etc. and converts the received sound signals into electrical voice data. In the call mode, the processed voice data can be converted into a format, which can be transmitted to a mobile communication base station through the mobile communication module 113, and then output. The microphone 123 can employ a variety of noise removal algorithms for removing noise occurring in the process of receiving external sound signals.

The user input unit 130 generates key entry data, which is input by a user in order to control the operation of the terminal. The user input unit 130 can include the keypad, the dome switch, the touch pad (static pressure/constant electricity), the jog wheel, the jog switch, the finger mouse or the like. In particular, a mutually layered structure of the touch pad and the display unit 151, which will be described later on, can be referred to as a touch screen.

The sensing unit 140 senses a current status of the mobile terminal 100, such as a closed state of the mobile terminal 100, the position of the mobile terminal 100, whether a user touches the mobile terminal 100 or not, and so on and generates a sensing signal for controlling the operation of the mobile terminal 100. For example, when the mobile terminal 100 is a slide phone type, the sensing unit 140 can sense whether the slide phone is opened or not. The sensing unit 140 can also have the functions of sensing whether the power supply unit 190 supplies power or not, whether the interface unit 170 is connected to an external device, and so on.

The output unit 150 is constructed to output audio signals, video signals or alarm signals and can include the display unit 151, a sound output module 153, an alarm unit 155, and so on.

The display unit 151 displays information processed in the mobile terminal 100. For example, when the mobile terminal is in the call mode, the display unit 151 displays a user interface (UI) or a graphic user interface (GUI), which is pertinent to a call. When the mobile terminal 100 is in the video call mode or the capturing mode, the display unit 151 displays captured or received images individually or simultaneously and also displays a UI or a GUI.

Meanwhile, in the case in which the display unit 151 and the touch pad form the mutually layered structure and construct a touch screen as described above, the display unit 151 can also be used as an input device as well as the output device. When the display unit 151 consists of a touch screen, it can include a touch screen panel, a touch screen panel controller, and so on. In this case, the touch screen panel is a transparent panel attached to the outside and can be connected to an internal bus within the mobile terminal 100. The touch screen panel continues to monitor whether there is a touch input and, when there is a touch input, sends corresponding signals to the touch screen panel controller. The touch screen panel controller processes the corresponding signals received from the touch screen panel and transmits the corresponding data to the controller 180, so that the controller 180 can understand whether there has been a touch input or which area of the touch screen has been touched.

The display unit 151 can include at least one of a liquid crystal display, a thin film transistor-liquid crystal display, an organic light-emitting diode, a flexible display, and a 3D display. Two or more display units 151 may exist according to the implementation type of the mobile terminal 100. For example, the mobile terminal 100 may be equipped with both an external display unit (not shown) and an internal display unit (not shown).

The sound output module 153 outputs audio data, which is received from the wireless communication unit 110 in the incoming call mode, the call mode, the record mode, the voice recognition mode, the incoming broadcasting mode or the like or stored in the memory 160. The sound output module 153 also outputs sound signals pertinent to the functions performed in the mobile terminal 100, for example, sound of a received call signal and sound of a received message. The sound output module 153 can include a speaker, a buzzer or the like.

The alarm unit 155 outputs signals to inform the occurrence of events in the mobile terminal 100. For example, events occurring in the mobile terminal 100 can include an incoming call signal, a received message, an entered key signal input and so on. The alarm unit 155 can also output signals to inform the occurrence of events in different ways other than the audio or video signals. For example, the alarm unit 155 can output the signals in vibration form. When a call signal is received or a message is received, the alarm unit 155 can generate a vibration signal in order to inform the reception of the call signal or message. Alternatively, when a key signal is input, the alarm unit 155 can generate a vibration signal as a feedback to the input key signal. A user can notice the occurrence of an event through the output of the vibration signal. It is to be understood that the signals to inform the occurrence of events can also be output through the display unit 151 or the sound output module 153.

The memory 160 can store programs necessary to process and control the controller 180 and also function to temporarily store input or output data (for example, a phonebook, messages, still images, motion images and the like).

The memory 160 can include at least one type of storage media, including a flash memory type, a hard disk type, a multimedia card micro type, card type memory (for example, SD memory, XD memory, and so on), RAM, and ROM. The mobile terminal 100 can also manage a web storage serving as the storage function of the memory 160 on an Internet.

The interface unit 170 serves as an interface with all external devices connected to the mobile terminal 100. Examples of the external devices connected to the mobile terminal 100 can include a wired/wireless headset, an external charger, wired/wireless data ports, a memory card, a card socket such as subscriber identification module (SIM)/user identity module (UIM) cards, an audio input/output (I/O) terminal, a video I/O terminal, an earphone, and so on. The interface unit 170 can receive data or can be supplied with power from the external devices, transfer the data or power to respective constituent elements of the mobile terminal 100, and transmit data of the mobile terminal 100 to the external devices.

The controller 180 typically controls an operation of each of the elements and controls an overall operation of the mobile terminal 100. For example, the controller 180 can perform pertinent controls and processes for voice call, data communication, video telephony, and so on. The controller 180 can include a multimedia play module 181 for playing multimedia. The multimedia play module 181 can be constructed in hardware within the controller 180 or constructed in software separately from the controller 180.

The power supply unit 190 is supplied with external power source or internal power source and supplies power source necessary for the operation of the each constituent element under the control of the controller 180.

The mobile terminal pertinent to the present invention has been described so far from a viewpoint of the constituent elements according to its functions. Hereinafter, the mobile terminal related to the present invention is further described from a viewpoint of the constituent elements according to its external shape with reference to FIGS. 2 and 3. Of several types of mobile terminals, such as a folding type, a bar type, a swing type, and a sliding type, the bar type mobile terminal equipped with a full touch screen is described below as an example, for convenience of description. However, it is to be understood that the present invention is not limited to the bar type mobile terminal, but instead may be applied to all types of mobile terminals, including the above types.

Figure 2:
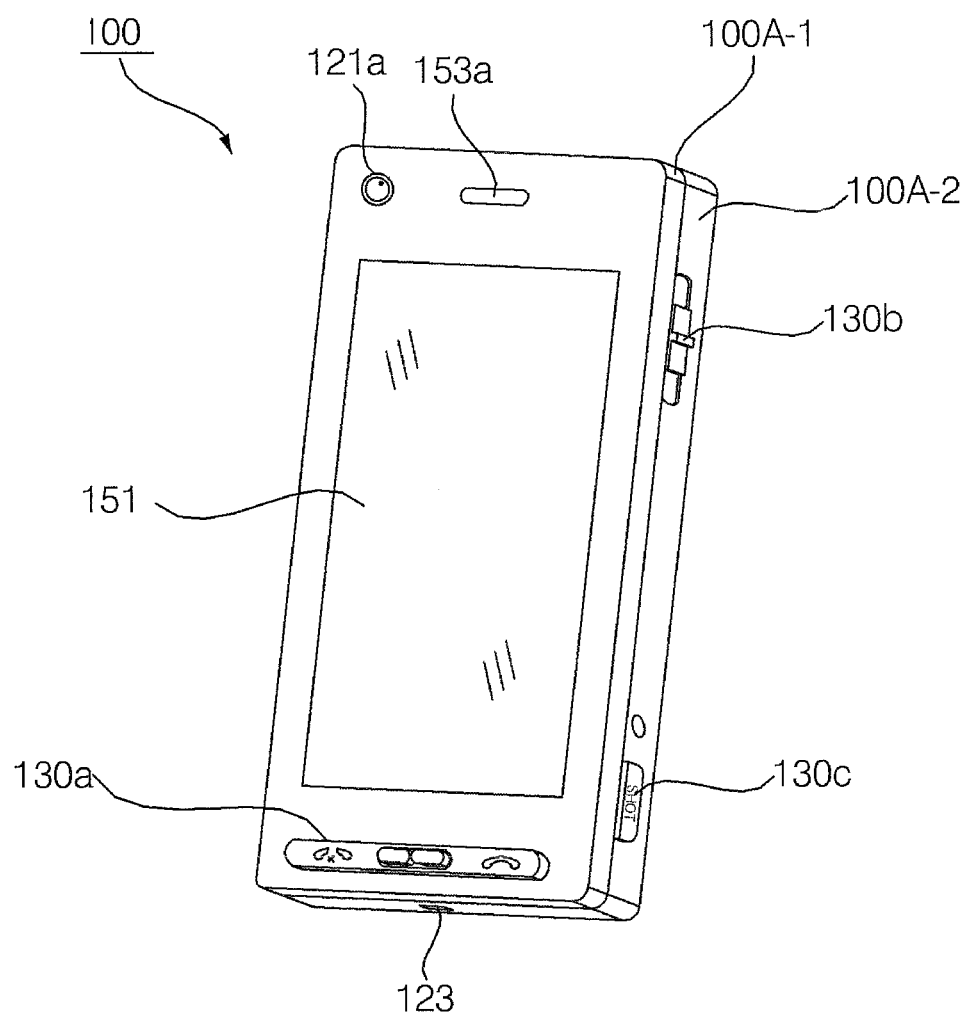
FIG. 2 is a front perspective view of the mobile terminal in accordance with an embodiment.

FIG. 2 is a front perspective view of the mobile terminal in accordance with an embodiment of the present invention. Referring to FIG. 2, a casing constituting an external shape of the mobile terminal 100 is comprised of a front casing 100A-1 and a rear casing 100A-2. A variety of electronic components are built in the space formed by the front casing 100A-1 and the rear casing 100A-2. At least one middle casing can be further disposed between the front casing 100A-1 and the rear casing 100A-2. The casings can be formed by injecting synthetic resin or can be formed from metal such as stainless steel (STS) or titanium (Ti).

In a main body, more particularly, in the front casing 100A-1 are disposed the display module 151, a first sound output module 153a, a first camera 121a, and a first user input unit 130a. Further, a second user input unit 130b, a third user input unit 130c, and a microphone 123 can be disposed on the sides of the rear casing 100A-2.

The display unit 151 includes a LCD, an OLED or the like for visually displaying information. A touch pad can be overlapped with the display unit 151 in the layered structure, so the display unit 151 can operate as a touch screen in order to enable the input of information by the touch of a user.

The first sound output module 153a can be implemented in the form of a receiver or speaker. The first camera 121a can be implemented to capture images or motion images of a user, and so on. Further, the microphone 123 can be implemented properly in such a way as to receive a user's voice, other sound and so on.

The first to third user input units 130a, 130b, and 130c can be collectively called the user input unit 130. The user input unit 130 can adopt any kind of a method as long as it supports a tactile manner.

For example, the user input unit 130 can be implemented using a dome switch or a touch pad, which is able to receive commands or information by push or touch manipulation of a user, or can be implemented using a wheel or jog method for rotating the key, or a method employing Joystick. In terms of the function, the first user input unit 130a is adapted to input commands such as the start, the end, and call. The second user input unit 130b can be used as a mode setting key for entering an operating mode, etc. The third user input unit 130c can operate as a hot key for activating special functions within the mobile terminal 100.

Figure 3:
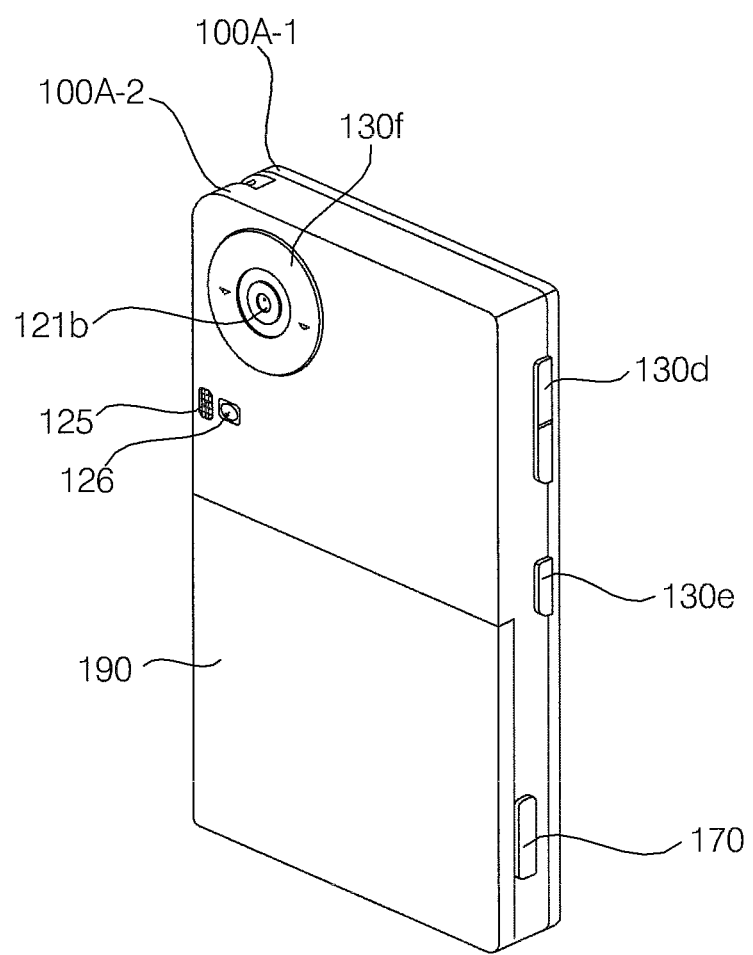
FIG. 3 is a rear perspective view of the mobile terminal in accordance with an embodiment.

FIG. 3 is a rear perspective view of the mobile terminal shown in FIG. 2. Referring to FIG. 3, a fourth user input unit 130d, a fifth user input unit 130e, and the interface unit 170 can be disposed on the side of the rear casing 100A-2. A second camera 121b can be further mounted on the rear side of the rear casing 100A-2.

The second camera 121b has a photographing direction substantially opposite to that of the first camera 121a and can have different pixels from that of the first camera 121a. For example, the first camera 121a can have low pixels sufficiently enough to capture an image of a user face and transmit the captured image to a counterpart in the video call or the like. The second camera 121b captures general subjects and can have high pixels because a photographed subject is not transmitted immediately.

A sixth user input unit 130f can be installed around the second camera 121b. The sixth user input unit 130f can employ a jog wheel enabling the rotation input or the like.

A flash 125 and a mirror 126 can be further disposed adjacent to the second camera 121b. The flash 125 illuminates light to a subject when the subject is photographed by the second camera 121b. The mirror 126 reflects a user's face, etc. when the user wants to have his picture taken (self-photographing) using the second camera 121b.

A second sound output module (not shown) can be further disposed in the second rear casing 100A-2. The second sound output module can implement a stereo function together with the first sound output module 153a and can also be used for a call in a speakerphone mode.

An antenna (not shown) for receiving broadcasting signals, other than an antenna for a call, etc., can be disposed on one side of the second rear casing 100A-2. The antenna can be drawn out from the second rear casing 100A-2.

The interface unit 170 becomes a passage, enabling the mobile terminal 100 to exchange data, etc. with external devices. For example, the interface unit 170 can be at least one of a connector for connecting to an earphone, a port for near area communication, and power supply terminals for supplying power to the mobile terminal 100 in a wired or wireless manner. The interface unit 170 can be a card socket for receiving external cards, such as a SIM, a UIM and a memory card for storing information.

The power supply unit 190 for supplying power to the mobile terminal is mounted on the part of the rear casing 100A-2. The power supply unit 190 can be, for example, a rechargeable battery and can be detachably coupled to the rear casing 100A-2 for charging purpose, and so on.

It has been described above that the second camera 121b and the like are disposed in the rear casing 100A-2, but the present invention is not limited to the above arrangement. Although the second camera 121b is not separately included, the first camera 121a can be rotatably formed so as to cover even the photographing direction of the second camera 121b.

A mobile terminal provides the function of outputting a key tone, etc. according to a pressed key when characters are input, but does not provide a function of distinguishing characters input by a tactile sense. In other words, a mobile terminal does provide the function of outputting a key tone or a vibration signal having a specific pattern according to a specific key pressed, but does not provide a function of distinguishing characters, such as input Korean consonants and vowels, the English alphabet, and numerals or, various other languages.

When characters are input or a file list, etc. is scrolled, a user can know the input characters, the scroll speed and the like only visually. Further, the mobile terminal does provide the function of varying high-speed scrolling, the scroll speed, etc. when a file list and so on is scrolled, but does not provide a function of knowing a change in the scroll speed, a current scrolling position or the like. The following solves such drawbacks.

Figure 4A:
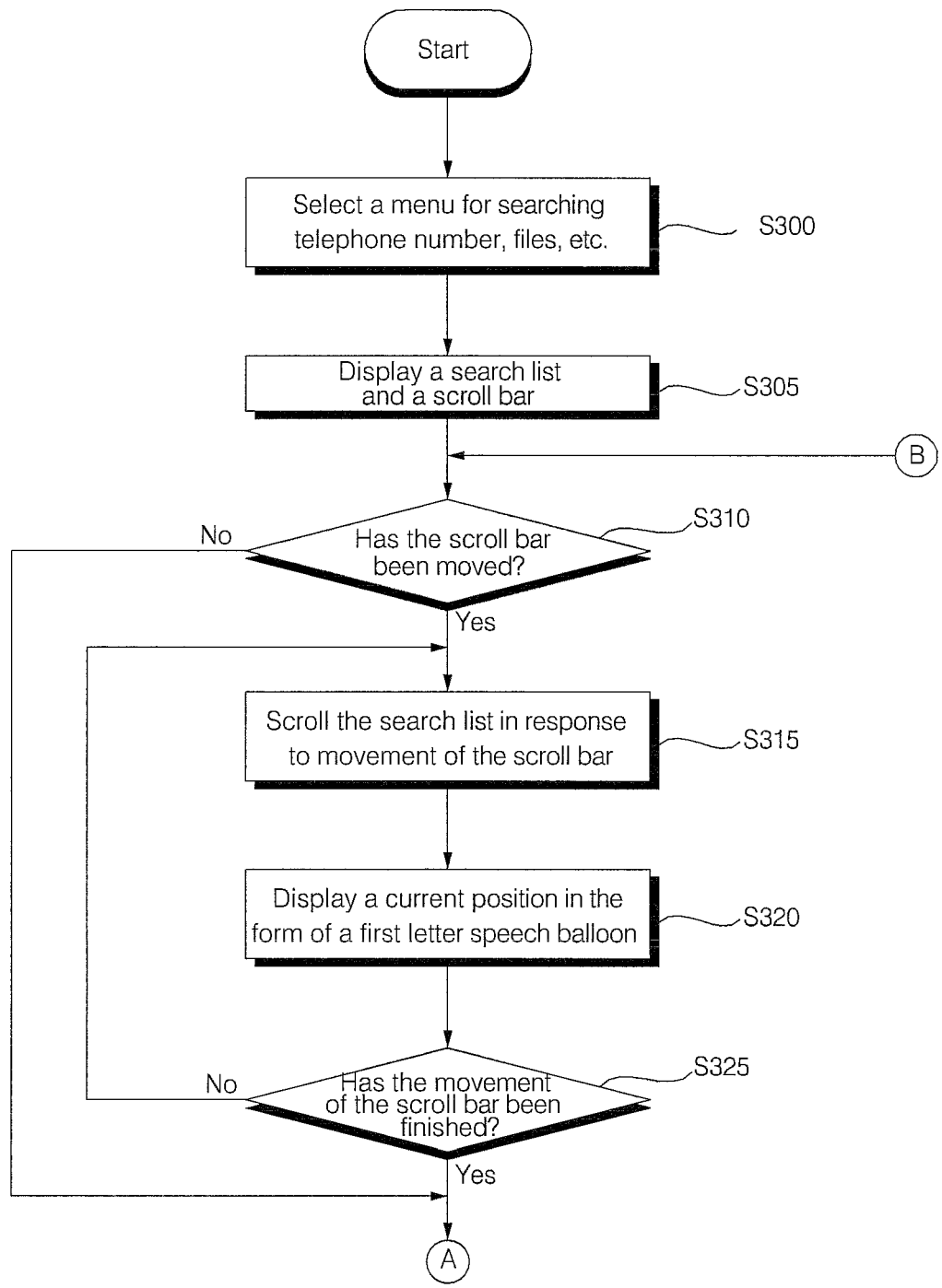
FIGS. 4A and 4B are flowcharts illustrating a method of controlling an operation of the mobile terminal in accordance with another embodiment.
Figure 4B:
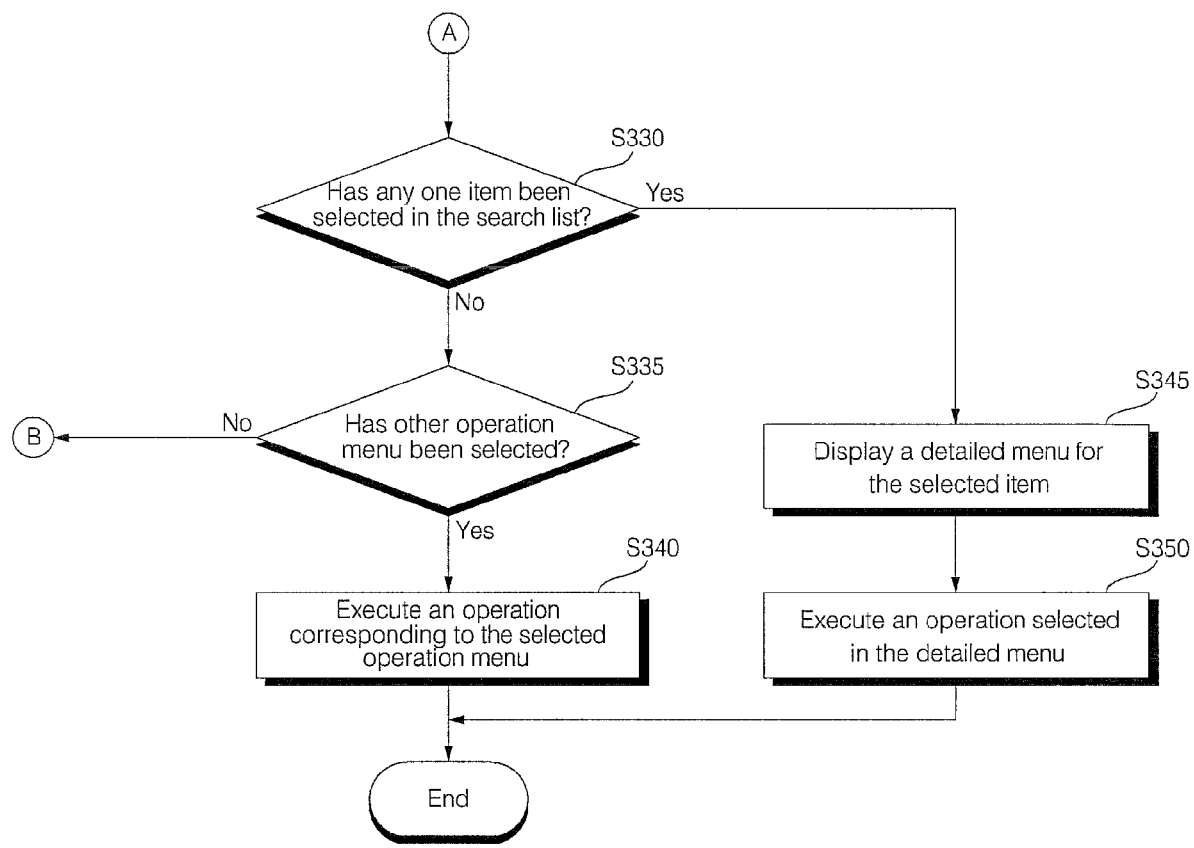

FIGS. 4A and 4B are flowcharts illustrating a method of controlling an operation of the mobile terminal in accordance with an embodiment. Referring to FIG. 4A, when a user selects a menu for searching a telephone number, a file or the like (S300), the controller 180 controls a search list in which a telephone number list, file names and so on are listed and a scroll bar for scrolling the search list to be displayed on the display unit 151 (S305).

The scroll bar indicates where is the information of a current screen located in the entire screen when all pieces of information cannot be displayed within a screen displayed on the display unit 151. The controller 180 also controls the contents of information, which is displayed on a screen, to be scrolled upward/downward or left/right as the scroll bar moves.

After the search list and the scroll bar are displayed, the controller 180 determines whether the scroll bar displayed on the display unit 150 has moved (S310). In the case in which the display unit 151 consists of a touch screen, the scroll bar can be moved in such a manner that the scroll bar is touched and dragged. Alternatively, the scroll bar may be moved using a Jog wheel key or a key defined to execute other scroll function.

If, as a result of the determination in step S310, the scroll bar has been moved according to the above method, the controller 180 controls the search list to be scrolled in response to a moving direction of the scroll bar (S315). In other words, when a moving direction of the scroll bar is downward, the controller 180 controls the search list to be scrolled downwardly and, when a moving direction of the scroll bar is upward, the controller 180 controls the search list to be scrolled upwardly. Alternatively, the controller 180 may control the search list to be scrolled to the left or right according to the form of a search list displayed on the display unit 151.

During scrolling, the controller also controls the alarm unit such that the user can feel through tactile sense the movement or location of the scroll bar. For example, if the scrolling speed is fast, than the vibration may be a higher frequency (faster vibration) whereas if the scrolling speed is slow, than the vibration may be a lower frequency (slower vibration). Further, the vibration may be also controlled based on pitch, strength and duration to indicate the speed of scrolling.

The controller 180 controls an identifying character for identifying a current scrolling position to be displayed in the form of speech balloon along with the scrolling of the search list (S320). The speech balloon is meant that speaking of persons in a cartoon, etc. is surrounded by a balloon shape and expressed. In the present embodiment, the speech balloon is used as a meaning to include the tooltip, which pops up when the mouse cursor in a web page, etc. is taken. Further, the controller 180 controls the alarm unit such that a unique vibration is associated with each speech balloon. Separately or together with the unique vibration, the controller 180 may control the alarm unit to generate a prescribed vibration when there is a transition from one group or one speech balloon to another group or another speech balloon.

In addition, the identifying character, which is able to indicate a current scrolling position, can be indicated by the first letter in the name of an item corresponding to the current scrolling position. The first letter refers to the first letter in a word or sentence. However, when it is not necessarily necessary to indicate the identifying character as the first letter, an adequate character can be used according to use environment.

This scrolling of the search list and the identifying character of the speech balloon shape are executed repeatedly until the movement of the scroll bar is finished (S325).

If it is determined that any one item has been selected in the search list (S330), the controller 180 controls a detailed menu for the selected item to be displayed (S345). The controller 180 then controls an operation, which is selected in the detailed menu, to be executed (S350). Alternatively, the controller 180 may control a default operation, which corresponds to a selected item, to be immediately executed without displaying a detailed menu according to use environment.

If it is determined that another operation menu item displayed on the display unit 151 other than the search list has been selected (S335), the controller 180 controls an operation, corresponding to the selected operation menu, to be executed (S340).

In the case in which a search list is scrolled through the above process, a current scrolling position can be displayed in such a way as to be easily identified, and an operation necessary for an item selected in the search list may be executed. Further, although, in the above embodiment, a search list has been described as an example, the present invention is not necessarily limited to the case where the search list is scrolled, but can be applied to cases where other screen scrolling is necessary.

Figure 5:
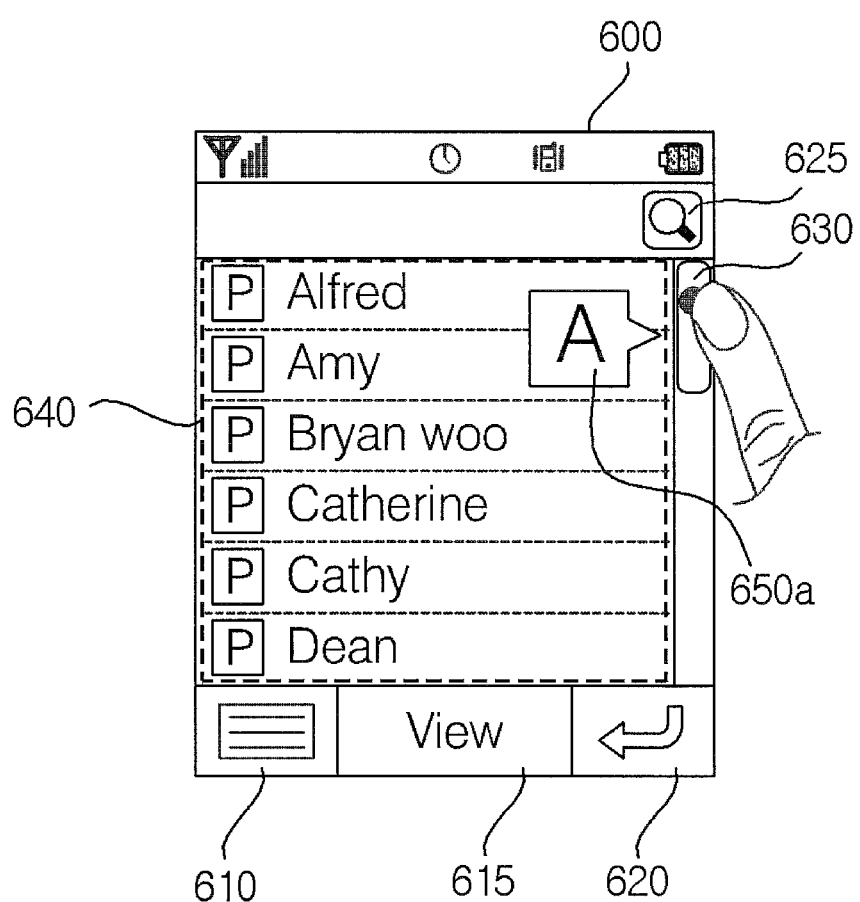
FIGS. 5 to 10 provided examples for clarifying the method of FIG. 4.

FIGS. 5 to 10 provides examples for clarifying the method for controlling the operation of the mobile terminal in accordance with FIG. 4. FIG. 5 shows a search screen 600 on which a search list and a scroll bar are displayed. Indicator icons are displayed at the top of the search screen 600. An icon 625, indicating the search screen, is displayed under the indicator icons. Menu items, such as an icon 610 for selecting other menus, a menu 615 showing the contents of a selected file, and an icon 620 for moving to a previous menu, are displayed at the bottom of the search screen 600.

A search list 640, such as a telephone directory list and files, is displayed on the search screen 600. FIG. 5 shows that a telephone directory list is displayed. A vertical scroll bar

630 for scrolling items, which are displayed as a search list, downwardly is displayed on the left side of the search list 640. Scroll arrows may be displayed on upper or lower sides of the scroll bar according to use environment.

In this state, if the scroll bar 630 is moved by a method of touching & dragging the scroll bar, etc., an identifying character to identify a current scrolling position is displayed in the form of speech balloon. Here, the displayed character can be represented by the first letter in the name of an item corresponding to a current scrolling position. In FIG. 5, reference numeral 650a indicates that an identifying character, indicating that a current scrolling position is placed at an item that begins with the first letter 'A', is represented by the speech balloon shape.

Figure 6:
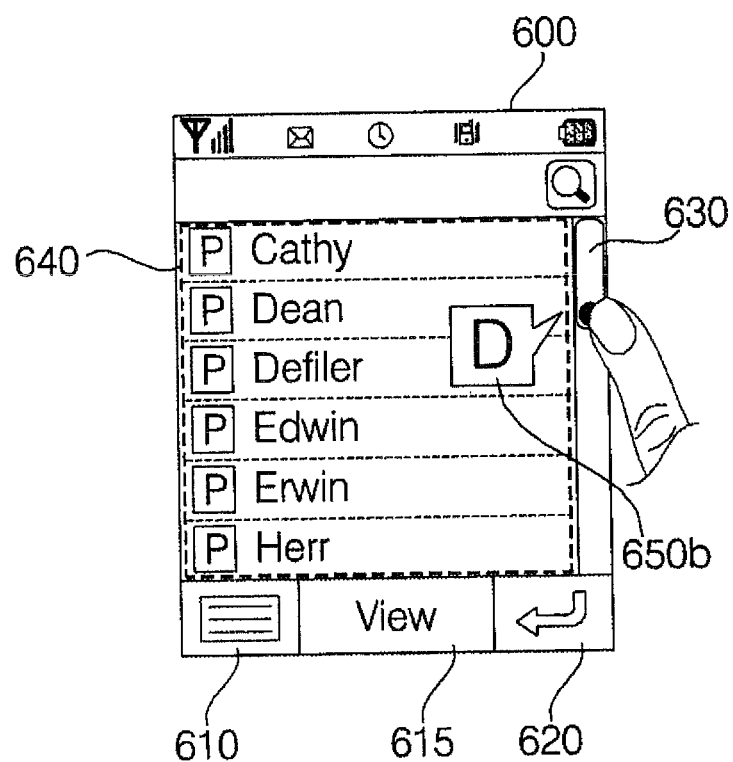

FIG. 6 shows a state where the search list is scrolled downward when the scroll bar 630 moves downward. Reference numeral 650b indicates that an identifying character, indicating that a current scrolling position is placed at an item that begins with the first letter ' C', is represented by the speech balloon shape.

Figure 7:
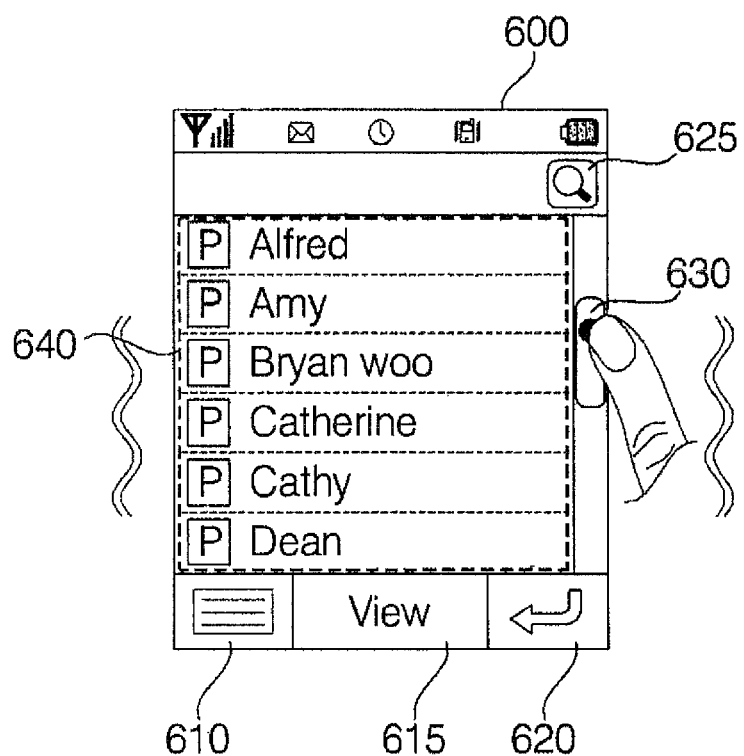

As shown, a list of items, e.g., telephone directory, are grouped together based on an alphabetical order. In this example, the vibration unit is configured to generate one type of vibration as the items are scrolled from one group to another group. When the scroll position corresponds with "A" represented by the speech balloon shape, a first type of vibration having a first pitch, frequency, strength and/or duration is provided, and the scroll position corresponds with "B" represented by the speech balloon shape, a second type of vibration having a second pitch, frequency, strength, and/or duration is provided. Similar type of vibration changes may be applicable as the scroll position changes. Alternatively, a first prescribed vibration may be provided during the transition of the scroll position from "A" to "B," and then a second prescribed vibration may be provided during the transition of the scroll position from "C" to "D," etc. The vibrations between transitions of the scroll position may be the same or different. This transition vibration may be combined with the above. Moreover, the speed of vibration may increase or decrease depending upon the scrolling speed, as shown in FIG. 7.

Figure 8:
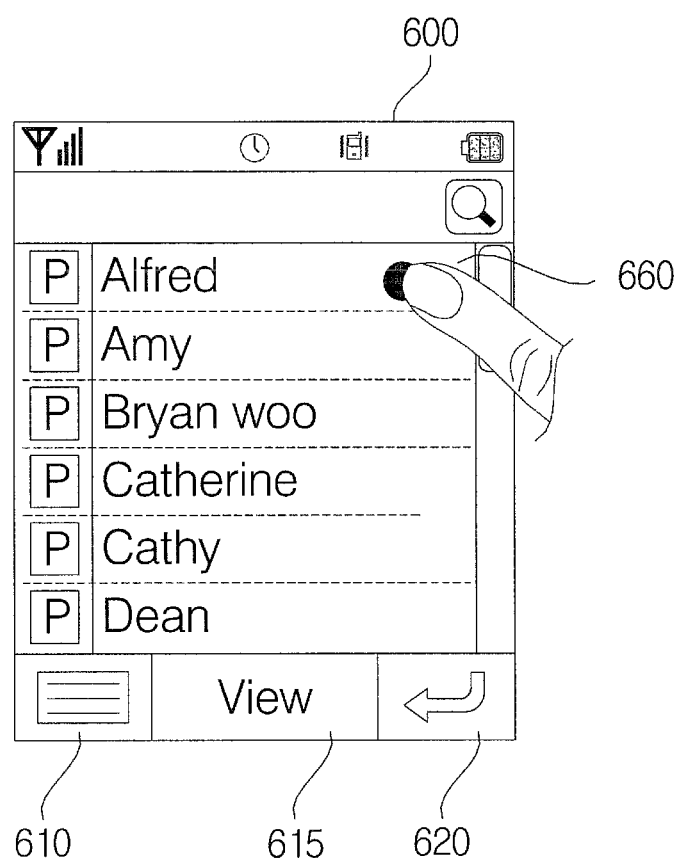

FIG. 8 shows a screen in which any one item is selected in the search list. As shown in FIG. 8, any one item 660 can be selected in the search list through touch input. If a detailed menu for the selected item exists, the corresponding detailed menu can be displayed. However, in the case where a default operation corresponding to a selected item has been set, the default operation may be executed immediately. Alternatively, when the touch input is short, a detailed menu may be displayed and, when the touch input is long, a default operation may be executed immediately.

Figure 9:
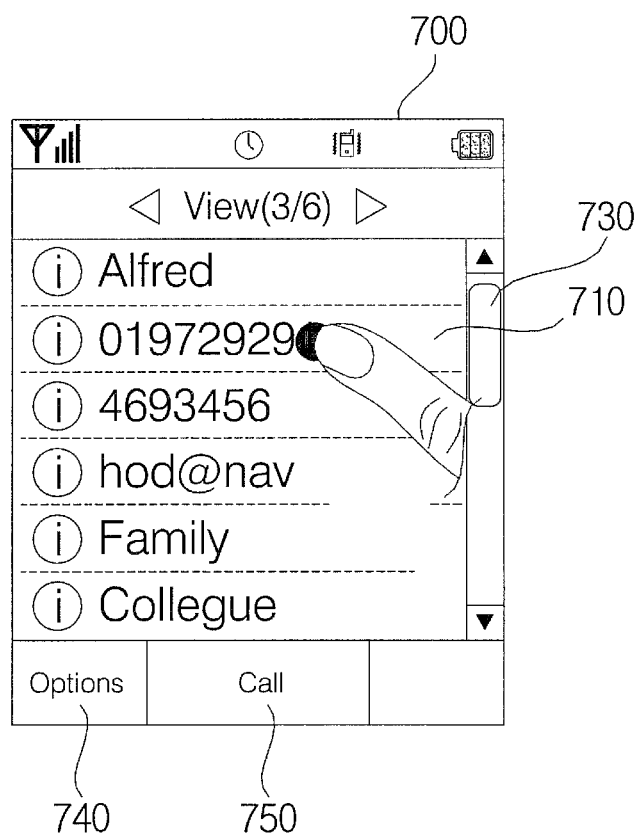

FIG. 9 shows a screen 700 on which, when any one item is selected in a search list displaying a telephone directory list is selected, a corresponding detailed menu is displayed. FIG. 9 shows items such as the name of a selected telephone directory list, a mobile phone number, a home telephone number, an e-mail address, and a group. If a telephone number is selected in this detailed menu and 'Call' 750 is then pressed, a call can be made to a corresponding person. In order to select other option items, 'Options' 740 can be selected.

Figure 10:

FIG. 10 shows a state screen 800 in which a call to the telephone number selected in the detailed menu of FIG. 9 is being requested. If there is a stored image corresponding to the telephone number of a person who has requested the call, the stored image can be displayed along with the person's telephone number. Alternatively, a keypad for entering numerals, texts, etc., may be displayed by selecting a menu item 'keypad' 810.

In FIGS. 8 and 9, a vibration may be provided for each selection. In FIG. 8, a vibration corresponding to selection of "Alfred" may be set, e.g., each name of the directory may be associated with a prescribed vibration to distinguish over each other. In FIG. 9, a vibration corresponding to selection of "01972929" may be set, e.g., each information associated with "Alfred" may be associated with a prescribed vibration to distinguish over each other. Further in FIG. 10, a prescribed vibration may be associated with the picture ID or animation when the call is placed. For example, a user may set a soothing vibration for a close friend whereas a user may set a course or undesirable vibration for a person whom the user may dislike. Similar vibrations may be used when the user receives a call from the close friend of the person whom the user dislikes.

Figure 11:
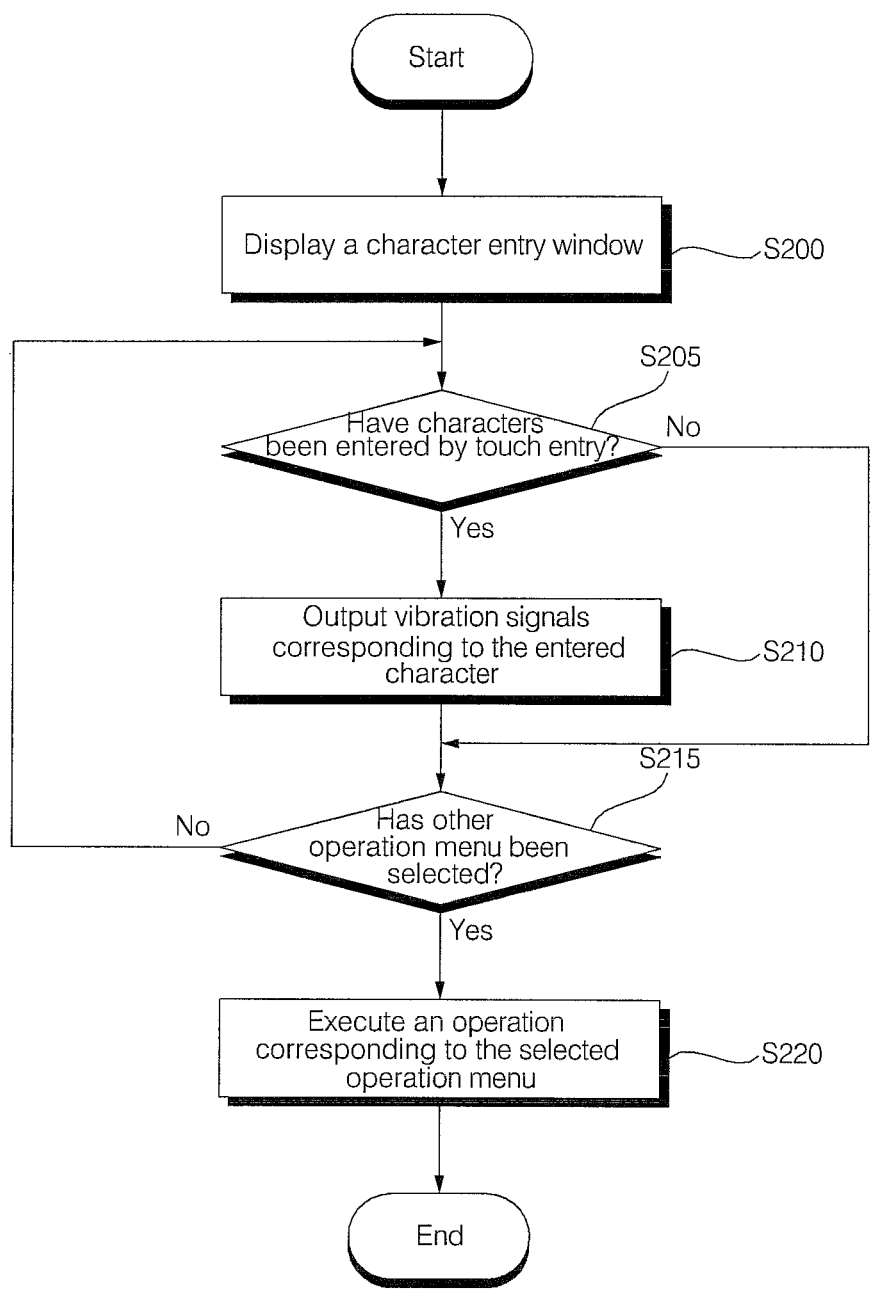
FIG. 11 is a flowchart illustrating a method of controlling an operation of the mobile terminal in accordance with another embodiment.

FIG. 11 is a flowchart illustrating a method of controlling an operation of the mobile terminal in accordance with another embodiment of the present invention. Referring to FIG. 11, the controller 180 controls a character input window in which characters, such as the Korean alphabet, the English alphabet, Chinese characters, numerals, and a punctuation mark, can be input through touch input to be displayed on the display unit 151 consisting of a touch screen in response to a menu selected by a user, such as message transmission and search for a telephone number or a file, (S200). The controller 180 determines whether specific characters have been input by the touch input through the character input window (S205).

If, as a result of the determination, characters have been input through the character input window, the controller 180 controls different default vibration signals to be output in response to the input characters (S210). That is, the controller 180 controls the alarm unit 155 to output different vibration signals according to the input characters through the character input window.

Accordingly, a user can identify the input characters based on the output vibration signals. Here, a user can set the vibration signals, which are output according to the input characters, according to desired output patterns. In response to a driven menu, the controller 180 may control a character input through the character input window to be displayed in a specific area of the display unit 151 along with the output of a vibration signal.

The output of a vibration signal according to an input character is repeatedly performed until another operation menu displayed on the display unit 151 is selected. If it is determined that another operation menu item displayed on the display unit 151 has been selected (S215), the controller 180 controls an operation, corresponding to a selected operation menu, to be executed (S220).

Through the above process, different vibration signals are output according to input characters. Accordingly, a user can understand which character has been input based on an output vibration signal even through a tactile sense.

Figure 12:
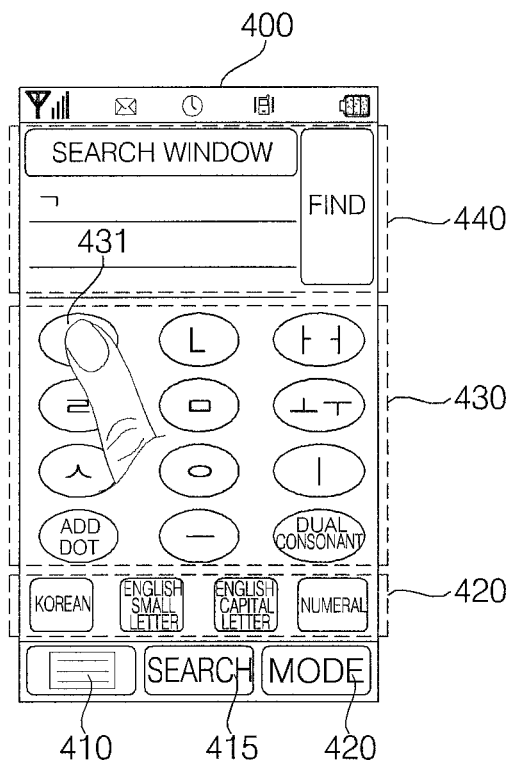
FIGS. 12 to 14 provide examples for clarifying the method of FIG. 11.
Figure 13:
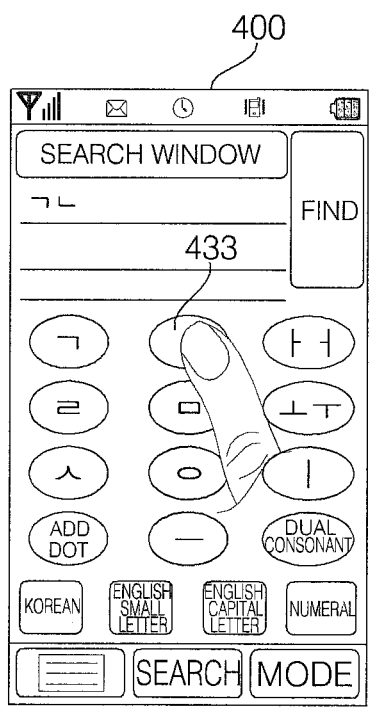
Figure 14:
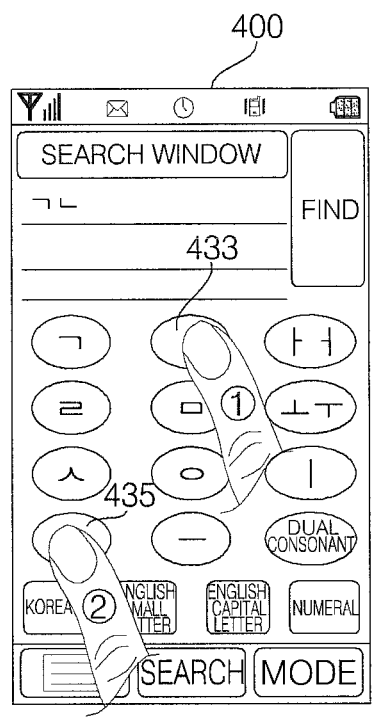

FIGS. 12 to 14 provided examples for clarifying the method of FIG. 11.

FIGS. 12 to 14 show examples of a search screen 400, which can be used to search files, telephone numbers and so on by inputting characters by touch. Indicator icons are displayed at the top of the search screen 400. A display window 440 and a character input window 430 are displayed under the indicator icons. A letter entered through the character input window 430 is displayed on the display window 440. A window 420 for selecting and entering the Korean alphabet, the English capital and small letters, numerals and so on is displayed under the character input window 430. Menu items, such as icons 410 for selecting other menus, Search 415 for executing search, and Mode 420 for selecting a mode, are displayed under the window 420.

In this search screen 400, FIG. 12 shows a state where a 'ㄱ' key 431 displayed on the character input window 430 is touched and a letter 'ㄱ' is entered, and FIG. 13 shows a state where a 'ㄴ' key 433 displayed on the character input window 430 is touched and a letter 'ㄴ' is entered. FIG. 14 shows a state where a 'ㄴ' key 435 and a 'Add dot' key 437 are consecutively selected and 'ㄷ' is consequently entered. 'Add dot' key 437 correspond to a predictive text entry based on entered text or may correspond to preset words based on entered text.

In this case, different vibration signals are output according to the entered Korean alphabet consonants 'ㄱ', 'ㄴ', and 'ㄷ'. That is, when the respective keys displayed on the character input window 430 are touched and entered, different vibration signals are output. When a stroke is added or even when dual consonants, etc. are entered, different vibration signals are output. Accordingly, a user can notice which letter has been entered by a sense of vibration even with a tactile sense. In this Figure, the Korean alphabets are shown, bust as can be appreciated, the features described herein are applicable to other alphabets.

Figure 15:
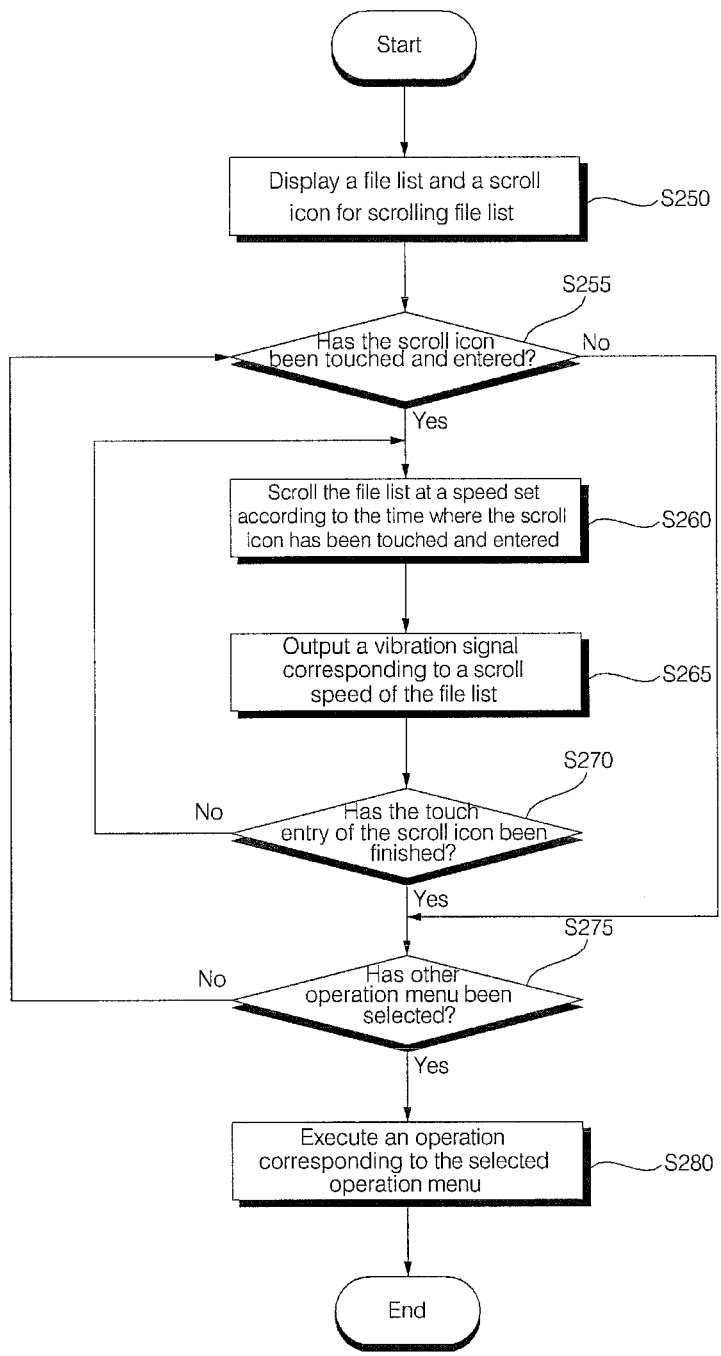
FIG. 15 is a flowchart illustrating a method of controlling an operation of the mobile terminal in accordance with another embodiment.

FIG. 15 is a flowchart illustrating a method of controlling an operation of the mobile terminal in accordance with another embodiment of the present invention. Referring to FIG. 15, when a menu for searching a playable multimedia file, etc. is selected by a user, the controller 180 controls a file list in which file names, etc. are listed, and a scroll arrow for scrolling a file list to be displayed on the display unit 151 consisting of a touch screen (S250).

Here, the scroll arrow is displayed when all pieces of information within a screen displayed on the display unit 151 cannot be displayed or the like. When an up scroll arrow is touched, the controller 180 controls a list, etc., which is displayed on the screen, to be scrolled upwardly. When a down scroll arrow is touched, the controller 180 controls a list, etc., which is displayed on the screen, to be scrolled downwardly. Alternatively, the controller 180 may control a list, etc., which is displayed on the screen, to be scrolled to the left or right according to the shape of a file list, etc., which is displayed on the display unit 151 or the touch of the scroll arrow. Further, the above configuration can be applied identically when a scroll bar is used instead of the scroll arrow.

After the file list and the scroll arrow are displayed, the controller 180 determines whether the scroll arrow displayed on the display unit 150 has been touched and entered (S255). If, as a result of the determination, there is touch through the scroll arrow, the controller 180 controls the file list to be scrolled at a default scroll speed according to the time when the scroll arrow is touched and entered (S260). In other words, when there is a first touch through the scroll arrow, the controller 180 controls the file list to be scrolled at a basic speed. When the touch of the scroll arrow continues, the controller 180 controls the file list to be scrolled at a faster scroll speed step by step.

In the case in which the scroll bar is used, after the scroll bar is touched, a file list may be scrolled in response to a direction where the scroll bar is dragged. When the touch of the scroll bar continues, the file list may be scrolled at a faster scroll speed step by step.

If the scroll speed changes, the controller 180 controls a vibration signal to be output along with the scrolling of the file list (S265). That is, whenever the scroll speed changes, the controller 180 can control vibration signals of different patterns to be output. Alternatively, the controller 180 may control a vibration signal to be output such that a current scrolling position can be identified as well as the scroll speed according to use environment. For example, in the case in which scrolling of one page or a certain range is performed, the controller 180 may control a vibration signal to be output or in the case in which an initial letter of a file name in a file list, etc. changes, the controller 180 may control a vibration signal to be output. The scrolling of the file list and the output of the vibration signal are displayed repeatedly until the touch through the scroll arrow is finished (S270).

If it is determined that another operation menu item displayed on the display unit 151 other than the scroll arrow has been selected (S275), the controller 180 controls an operation, corresponding to the selected operation menu, to be executed (S280). The operation corresponding to the selected operation menu can include an operation for selecting and playing any one item in a file list, an operation for switching a menu for voice call, mail transmission, etc. and so on.

In the case in which a file list is scrolled through the above process, vibration signals can be output such that a change in the scroll speed, a current scrolling position, the degree of a scrolling progress and so on can be identified. Further, in the case in which the display unit 151 does not consist of a touch screen, a scroll arrow may be selected according to the entry of a key, which is defined to execute a scroll function, such that the same operation as that of the above embodiment is executed.

Moreover, although, in the above embodiment, a file list has been described as an example, the present application is not necessarily limited to the case where the file list is scrolled, but can be applied to cases where other screen scrolling is necessary.

Figure 16:
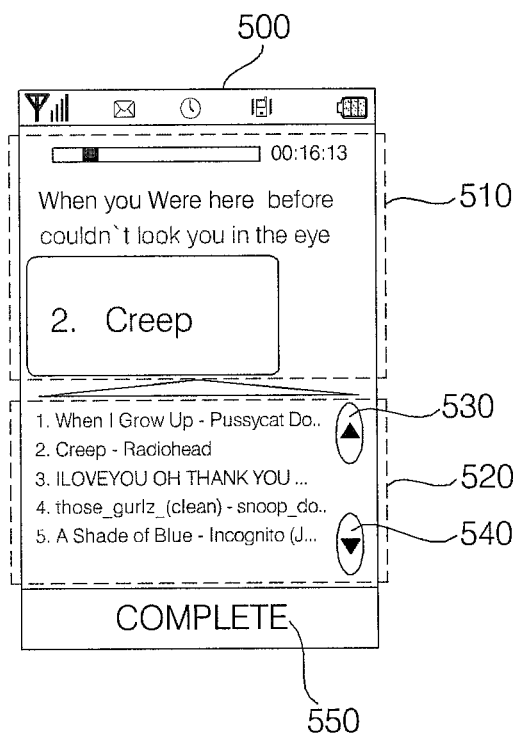
FIG. 16 provided an example for clarifying the method of FIG. 15.

FIG. 16 is an example for clarifying the method of FIG. 15. FIG. 16 shows an example of a play screen 500 of a multimedia file. A first window 510 on which a play state or pertinent information of a multimedia file, which is being played, is displayed is displayed on an upper portion of the play screen 500. A second window 520 on which a file list and scroll arrows 530 and 540 are displayed is displayed on a lower portion of the play screen 500.

In this play screen 500, when the upper scroll arrow 530 displayed on the second window 520 is touched, a file list is scrolled upward. When the lower scroll arrow 540 displayed on the second window 520 is touched, a file list is scrolled downward.

When the scroll arrows 530 and 540 are first touched, a file list is scrolled at a basic speed and, when the touch of the scroll arrows 530 and 540 continues, the scroll speed increases step by step. In this case, vibration signals of different patterns can be output whenever the scroll speed changes. Further, even when a specific range such as one page is scrolled, when a specific list is scrolled or the like, a vibration signal can be output.

Accordingly, a user can notice a change in the scroll speed, the degree of scrolling progress, a current scrolling position and so on through a tactile sense. As can be appreciated, the various features described for FIGS. 4A-10 may be applicable to this embodiment.

Meanwhile, the present disclosure can be implemented as a code readable by a processor in a recording medium readable by a processor included in a mobile terminal such as a mobile station modem (MSM). The processor-readable recording medium can include all kinds of recording devices in which data readable by the processor is stored. For example, the processor-readable recording medium can include ROM, RAM, CD-ROM, magnetic tapes, floppy disks, optical data storages, and so on, and can also be implemented in the form of carrier waves, such as transmission over the Internet. Further, the processor-readable recording medium can be distributed into computer systems connected over a network, so codes readable by a processor can be stored and executed in a distributed manner.

Further, the mobile terminal and the method of controlling the operation of the same are not limited to the constructions and methods described in connection with the above embodiments, but the embodiments may be selectively combined and configured partially or entirely so that they can be modified in various manners.

In the event of message transmission, search for a telephone number or a file and so on, different vibration signals can be output according to entered characters. Further, a vibration signal of a specific default pattern can be output in response to a change in the scroll speed or the degree of scrolling. Accordingly, a user can notice an entered character, a scroll speed and so on through a tactile sense even without depending on the sense of sight and therefore can be provided with user convenience.

Further, in the case where a list for searching a telephone number list, a file list or the like is scrolled, an identifying character to identify a current scrolling position can be displayed in the form of speech balloon or the like. Accordingly, a user can know a current scrolling position conveniently. Consequently, rapid search is enabled and search convenience can be provided. In addition, the present disclosure can be applied to a user interface of various environments.

A mobile terminal is provided in which a vibration signal, enabling input characters, a change in a screen scroll speed or a current scrolling position to be identified through a tactile sense, is output, and a method of controlling an operation of the same.

A mobile terminal is provided in which an identifying character to easily identify a current scrolling position when a search list, etc. are scrolled is displayed, and a method of controlling an operation of the same.

A method of controlling an operation of a mobile terminal includes the steps of displaying a character input window in which characters can be entered by touch input on a touch screen, and when characters are entered by touch input through the character input window, outputting different vibration signals according to the entered characters.

A method of controlling an operation of a mobile terminal includes the steps of displaying a file list and scroll arrows for scrolling the file list on a touch screen, when the scroll arrow is touched and entered, scrolling the file list at a scroll speed previously set in response to a time when the scroll arrow is touched and entered, and outputting a vibration signal to identify at least one of a scroll speed and a current scrolling position of the file list.

A method of controlling an operation of a mobile terminal includes the steps of displaying a search list and a scroll bar for scrolling the search list, and scrolling the search list in response to a moving direction of the scroll bar and displaying an identifying character for enabling a current scrolling position to be identified in the search list.

A mobile terminal includes a touch screen displaying a character input window in which characters can be entered through touch input, an alarm unit outputting vibration signals, and a controller for, when characters are entered by touch input through the character input window, controlling the alarm unit to output different vibration signals according to the entered characters.

A mobile terminal includes a touch screen on which a file list and scroll arrows for scrolling the file list are displayed, an alarm unit outputting vibration signals, and a controller for, when the scroll arrow is touched and entered, controlling the file list to be scrolled at a scroll speed previously set in response to a time when the scroll arrow is touched and entered and controlling the alarm unit to output a vibration signal to identify at least one of a scroll speed and a current scrolling position of the file list.

A mobile terminal includes a display unit on which a search list and a scroll bar for scrolling the search list are displayed, and a controller for scrolling the search list in response to a moving direction of the scroll bar and controlling an identifying character to be displayed such that a current scrolling position can be identified in the search list.

Furthermore, the methods or operations may be executed using a program recorded on a computer readable recording medium by a controller of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a communication unit configured to at least one of transmit or receive signals, the signals being one of broadcast signals, mobile communication signals, wireless internet signals, short range communication signals or GPS signals;
a camera configured to capture at least one of a still image or a moving image;
a microphone configured to receive external audio;
a user input having at least one of keypad, a dome switch, a touch pad, a jog wheel, a jog switch, or a finger mouse;
an audio output module to output sound;
a vibration unit configure to generate at least one type of vibration;
a touch screen configured to display information or configured to receive information; and
a controller to control at least one operation of the communication unit, the camera, the microphone, the user input, the audio output module or the touch screen,
wherein, based on an operation mode of the mobile terminal, the controller controls the touch screen to display a list of items, the items being arranged together based on an alphabetical order, with a scroll area for searching the items and a search icon indicating the search window, the search icon being under one or more indicator icons,
wherein an identifying character to identify a current scrolling position is displayed when the scroll area is touched, wherein the identifying character disappears on the touch screen when touching or dragging the scroll area is finished, wherein the identifying character is represented by a first letter in the name of an item corresponding to the current scrolling position, wherein the identyfying character is overlapped with the list, and wherein:

the scroll area is an area in which a touch input or a dragging input is received to scroll the list of items by the touch input or the dragging input, when the scroll area is touched by the touch input, at least one part of the touched area of the scroll area is highlighted, and when the scroll area is dragged by the dragging input, the list of items is scrolled.

2. The mobile terminal of claim 1, wherein the items are arranged in groups and a different vibration is generated for a selection made for each group.

3. The mobile terminal of claim 1, wherein a soft keypad having one or more alphabetical letters is displayed when the search icon is touched.

4. The mobile terminal of claim 1, wherein the identifying character changes when the scroll area is touched and dragged.

5. The mobile terminal of claim 1, wherein the items are arranged in groups and wherein the identifying character includes information to identify one of the groups, said one of the groups corresponding to the current scrolling position of the scroll area.

6. The mobile terminal of claim 1, wherein the scroll area includes a scroll bar and wherein the scroll bar is moved based on touching and dragging input and indicates the current scrolling position.

7. The mobile terminal of claim 1, wherein:

when one item in the list is selected, a detailed menu corresponding to the selected item is displayed, and when a call icon for a call is selected, a call is made based on a telephone number corresponding to the selected item.

8. The mobile terminal of claim 1, wherein when a call is requested from a telephone number or when requesting a call to a telephone number, an image corresponding to the telephone number is displayed along with the telephone number and a keypad icon for entering a keypad display mode.

9. The mobile terminal of claim 1, wherein, when one item in the list is selected by a touch input, a different operation for the selected item is executed depending on a short touch input or a long touch input.

10. The mobile terminal of claim 1, wherein:

the scroll area includes a scroll bar, the scroll bar is a vertical scroll bar for downwardly or upwardly scrolling items in the list, and when one item in the list is scrolled left or right, an operation for a call or a message transferring is performed based on the scrolled item.

11. The mobile terminal of claim 1, wherein a size of the first letter is bigger than that of any other letter in the list.

12. The mobile terminal of claim 1, wherein a size of the first letter is bigger than that of any other letter in the list.

13. The mobile terminal of claim 1, wherein the list includes a name of each item and an image representing each item.

14. A mobile terminal of claim 1, comprising:

a communication unit configured to at least one of transmit or receive signals, the signals being one of broadcast signals, mobile communication signals, wireless internet signals, short range communication signals or GPS signals;

a camera configured to capture at least one of a still image or a moving image;

a microphone configured to receive external audio;

a user input having at least one of keypad, a dome switch, a touch pad, a jog wheel, a jog switch, or a finger mouse;

an audio output module to output sound;

a vibration unit configure to generate at least one type of vibration;

a touch screen configured to display information or configured to receive information; and a controller to control at least one operation of the communication unit, the camera, the microphone, the user input, the audio output module or the touch screen, wherein, based on an operation mode of the mobile terminal, the controller controls the touch screen to display a list of items, the items being arranged together based on an alphabetical order, with a scroll area for searching the items and a search icon indicating the search window, the search icon being under one or more indicator icons, wherein an identifying character to identify a current scrolling position is displayed when the scroll area is touched, wherein the identifying character disappears on the touch screen when touching or dragging the scroll area is finished, wherein the identifying character is represented by a first letter in the name of an item corresponding to the current scrolling position, wherein the first letter is overlapped with the list, and wherein the list of items is scrolled using the scroll area and as a speed of scrolling through the list of items changes, a pattern or type of the vibration changes to correspond to the speed.

15. A method of controlling a mobile terminal having a user input having at least one of keypad, a dome switch, a touch pad, a jog wheel, a jog switch, or a finger mouse, an audio output module to output sound, a vibration unit configure to generate at least one type of vibration; a touch screen configured to display information or configured to receive information, and a controller to control at least one operation of the user input, the audio output module or the touch screen, comprising:

displaying on the touch screen a list of items, the items being arranged together based on an alphabetical order, with a scroll area for searching the items and a search icon indicating the search window, the search icon being under an indicator icons, and displaying an identifying character to identify a current scrolling position according to touching the scroll area, wherein the identifying character disappears on the touch screen when touching or dragging the scroll area is finished, wherein the identifying character is represented by a first letter in the name of an item corresponding to the current scrolling position, wherein the first letter is overlapped with the list, wherein the scroll area is an area in which a touch input or a dragging input is received to scroll the list of items by the touch input or the dragging input, the method further comprising highlighting at least one part of the touched area of the scroll area when the scroll area is touched and scrolling the list of items when the scroll area is dragged by the dragging input.

16. The method of claim 15, wherein the items are arranged in groups and a different vibration is generated for each group of items in the list of items.

17. The method of claim 15, further comprising displaying a soft keypad having one or more alphabetical letters when the search icon is touched.

18. The method of claim 15, wherein the identifying character changes when the scroll area is touched and dragged.

19. The method of claim 15, wherein the items are arranged in groups and wherein the identifying character includes information to identify one of the groups, said one of the groups corresponding to the current scrolling position of the scroll area.

20. The method of claim 15, wherein the scroll area includes a scroll bar and wherein the scroll bar is moved based on touching and dragging input and indicates the current scrolling position.

21. The method of claim 15, wherein:
when one item in the list is selected, a detailed menu corresponding to the selected item is displayed, and
when a call icon for a call is selected, a call is made based on a telephone number corresponding to the selected item.

22. The method of claim 15, wherein, when a call is requested from a telephone number or requesting a call to a telephone number, an image corresponding to the telephone number is displayed along with the telephone number and a keypad icon for entering a keypad display mode.

23. The method of claim 15, wherein when one item in the list is selected by a touch input, a different operation for selected item is executed depending on a short touch input or a long touch input.

24. The method of claim 15, wherein:
the scroll area includes a scroll bar,
the scroll bar is a vertical scroll bar for downwardly or upwardly scrolling items in the list, and when one item in the list is scrolled left or right, an operation for a call or a message transferring is performed based on the scrolled item.

25. A method of controlling a mobile terminal having a user input having at least one of keypad, a dome switch, a touch pad, a jog wheel, a jog switch, or a finger mouse, an audio output module to output sound, a vibration unit configure to generate at least one type of vibration; a touch screen configured to display information or configured to receive information, and a controller to control at least one operation of the user input, the audio output module or the touch screen, comprising:
displaying on the touch screen a list of items, the items being arranged together based on an alphabetical order, with a scroll area for searching the items and a search icon indicating the search window, the search icon being under an indicator icons, and
displaying an identifying character to identify a current scrolling position according to touching the scroll area,
wherein the identifying character disappears on the touch screen when touching or dragging the scroll area is finished,
wherein the identifying character is represented by a first letter in the name of an item corresponding to the current scrolling position,
wherein the first letter is overlapped with the list, and wherein the list of items is scrolled using the scroll area and as a speed of scrolling through the list of items changes, a pattern or type of the vibration changes to correspond to the speed.

26. A mobile terminal, comprising:
a communication unit configured to at least one of transmit or receive signals, the signals being one of broadcast signals, mobile communication signals, wireless internet signals, short range communication signals or GPS signals;
a camera configured to capture at least one of a still image or a moving image;
a microphone configured to receive external audio;
a user input having at least one of keypad, a dome switch, a touch pad, a jog wheel, a jog switch, or a finger mouse;
an audio output module to output sound;
a vibration unit configure to generate at least one type of vibration;
a touch screen configured to display information or configured to receive information; and
a controller to control at least one operation of the communication unit, the camera, the microphone, the user input, the audio output module or the touch screen,
wherein, based on an operation mode of the mobile terminal, the controller controls the touch screen to display at least one of a list of items, the items being arranged together based on an alphabetical order, and
when at least one of the list of items is displayed, the controller is configured to control display a speech balloon corresponding to a position of a scroll area, and
wherein the items are arranged in groups,
wherein the speech balloon includes information to identify one of the groups, said one of the groups corresponding to a current scrolling position of the scroll area,
wherein the controller is configured to control a speech balloon when the scroll area is touched, and wherein the speech balloon overlaps the list of items, and wherein:
the scroll area is an area in which a touch input or a dragging input is received to scroll the list of items by the touch input or the dragging input,
when the scroll area is touched by the touch input, at least one part of the touched area of the scroll area is highlighted, and
when the scroll area is dragged by the dragging input, the list of items is scrolled.

27. The mobile terminal of claim 26, wherein a unique identification is provided within the speech balloon.

28. The mobile terminal of claim 26, wherein the information in the speech balloon includes a first character if an item in the list that corresponds to said one of the groups indicative of the current scrolling a position of the scroll area.

29. The mobile terminal of claim 26, wherein the list includes one of a phonebook list, a music file list, a media file list, a movie list, or a photo list.

30. The mobile terminal of claim 26, wherein content of the speech balloon changes when a first character of the list of items changes.

31. The mobile terminal of claim 26, wherein content of the speech balloon changes when the scroll area scrolls through different regions in the list of items.

32. The mobile terminal of claim 26, wherein the vibration unit generates a vibration when the numbers in the keypad are passed through by one of dragging, scrolling or flicking.

33. The mobile terminal of claim 26, wherein the vibration unit generates a vibration based on passing through a plurality of displayed soft keys.

* * * * *